Figure 1:
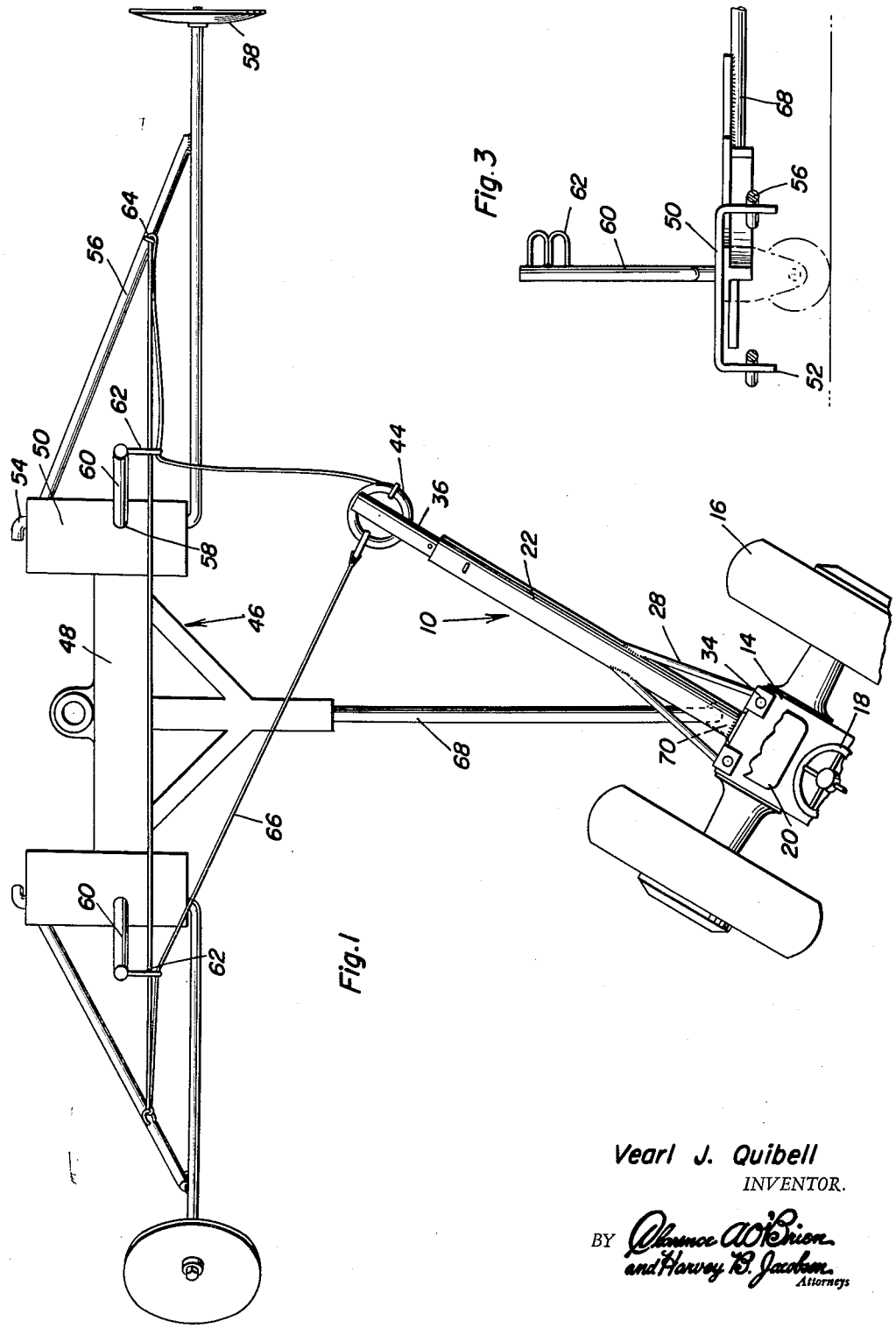
Figure 2:
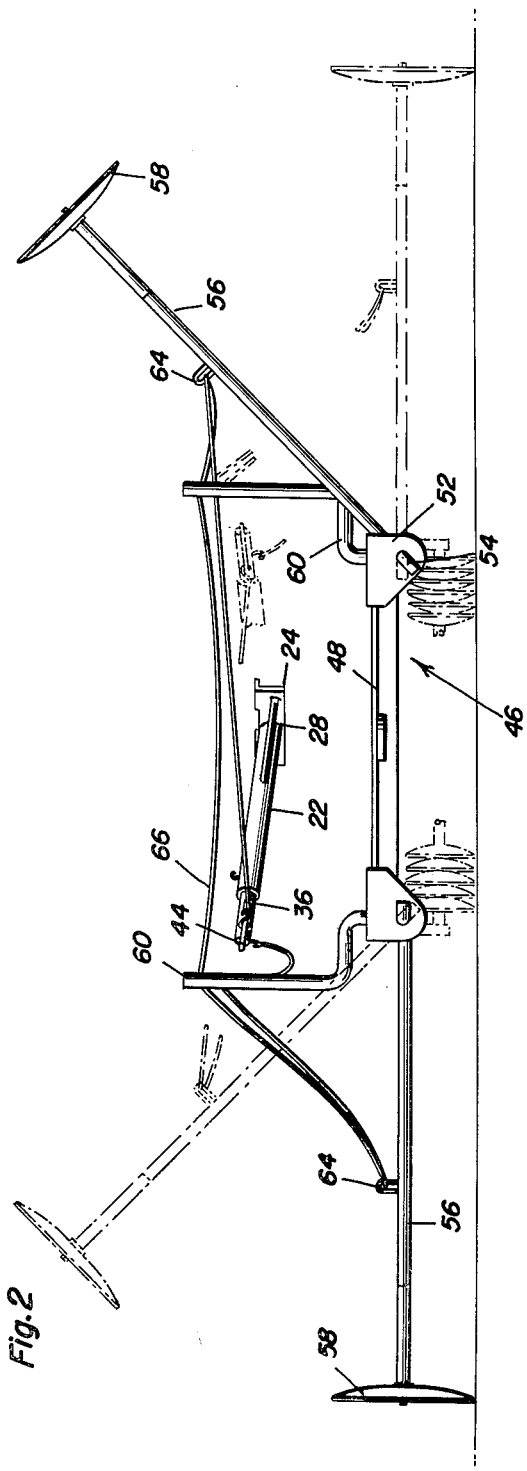
Figure 4:
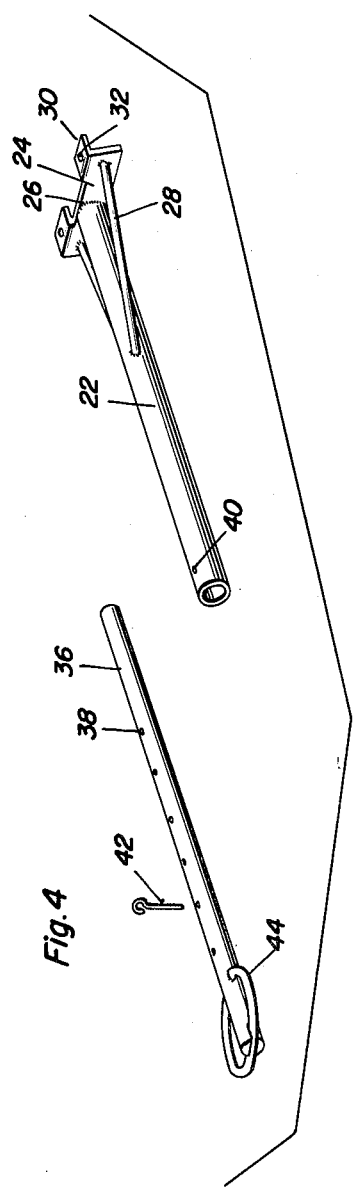

Feb. 20, 1962 V. J. QUIBELL 3,021,905
AUTOMATIC MARKER CHANGER
Filed March 24, 1958 2 Sheets-Sheet 1

Vearl J. Quibell
INVENTOR.

Feb. 20, 1962 V. J. QUIBELL 3,021,905
AUTOMATIC MARKER CHANGER
Filed March 24, 1958
2 Sheets-Sheet 2

Vearl J. Quibell
INVENTOR.

BY *Clarence A. O'Brien*
*and Harvey B. Jackson*
Attorneys though not shown in the drawings but it is not necessary to have any type of tensioning device for the control lines inasmuch as the automatic action of the ring 44 in relation to the wheels 16 of the tractor and the connection between the tongue 68 and the lug or drawbar 70 will automatically and positively lift one marker and enable the other marker to drop by gravity when the tractor is turned at the end of a field whereby the operator need not concern himself with operating control for the markers inasmuch as one marker will always be down and the other marker will always be up depending upon the direction of turning of the tractor.

3,021,905

3

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a tractor having a transverse differential housing and a towed implement connected with the tractor for pivotal movement about a generally vertical axis and said implement having a pair of markers mounted thereon for vertical swinging movement outwardly from opposite sides thereof, an automatic marker changer attached to the differential housing on the tractor and operatively engaged with the markers for alternately lifting and lowering the markers in response to pivotal movement of the tractor in relation to the implement, said marker changer including an elongated tubular member rigidly and demountably secured to and projecting rearwardly from the differential housing, a telescopic member slidably mounted in the tubular member and provided with means for adjustably securing the telescopic member in selected longitudinal adjusted position, an annular member rigid with the outer end of the telescopic member and disposed in a generally horizontal plane and a flexible control cable operatively connecting the markers and extending around the annular member whereby pivotal movement of the tractor in one direction will cause

4 lifting movement of one marker and lowering movement of the other marker.

2. The combination of claim 1 wherein said tubular member is provided with a transverse plate at the forward end thereof, said plate being rigid with the tubular member and also being rigid with the differential housing by bolts or the like engaged through laterally extending lugs on the differential housing, braces extending between the upper edge of the plate and the tubular member for reinforcing and rigidifying the connection between the tubular member and the plate.

3. The combination of claim 2 wherein said implement includes a transverse plate having a longitudinally extending plate at each end thereof, each of said longitudinally extending plates having a depending flange with an aperture therein for pivotally receiving the inner end of a diagonally extending marker arm having a marker disk journaled on the outer end thereof, said cable being interconnected between the pair of marker arms and encircling the annular member whereby relative pivotal movement between the tractor and implement will alternately lift and lower the markers.

References Cited in the file of this patent

UNITED STATES PATENTS

| 1,830,849 | Bump | Nov. 10, 1931 |
| 2,337,749 | Hoffman | Dec. 28, 1943 |
| 2,347,748 | Graham | May 2, 1944 |
| 2,431,016 | Wagner | Nov. 18, 1947 |
| 2,456,728 | Leichner et al. | Dec. 21, 1948 |
| 2,532,786 | Cook | Dec. 5, 1950 |
| 2,612,827 | Bump | Oct. 7, 1952 |
| 2,715,865 | Coty | Aug. 23, 1955 |
| 2,755,721 | Brown et al. | July 24, 1956 |
| 2,795,178 | Wagner | June 11, 1957 | and extending between that marker and the ring 44. Thus, with the present invention, the markers are automatically raised and lowered in response to turning movement of the tractor in relation to the implement.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tractor drawn marking implement combination comprising, tractor vehicle means, marker mounting means pivotally connected to said tractor vehicle means about a vertical axis and extending rearwardly therefrom, a pair of marker means pivotally mounted on the mounting means and extending laterally therefrom for angular positioning in a common plane perpendicular to the direction of travel of the implement, flexible means interconnecting said marker means at points in spaced relation to the mounting means and limiting angular positioning of the marker means with respect to each other, said flexible means including connecting portions, and changer means rigidly mounted on the tractor vehicle means and extending rearwardly from the vertical axis in operative connection to said connecting portions of the flexible means to effect angular displacement of one of the marker means in response to turning of the tractor vehicle means relative to the mounting means in one direction about the vertical axis.

2. The combination of claim 1, wherein said changer means comprises, a bracket member rigidly attached to a rear portion of the tractor vehicle means, an adjustable elongated member attached to the bracket member extending rearwardly therefrom, a mounting ring fixed to a rear terminal end of the elongated member and connected to said connecting portions.

3. In combination, an implement, an earth marker mounted at each side of said implement, marker pivot means swingably mounting each marker to said implement for substantial vertical swinging movement into and out of extended marking position, a tow tractor having a rear pivot connecting said tractor to said implement whereby the tractor is adapted to turn relative to said implement, and an automatic marker changer comprising an elongated member fixedly attached to said tractor and extending rearwardly of said rear pivot for swinging about said rear pivot relative to said implement in response to turning of said tractor, a flexible member fixed intermediate its end portions to each of said markers at a point remote from said marker pivot means for limiting the relative outward movement of said markers whereby swinging of one marker into marking position will swing the other marker out of marking position, each of said end portions of said flexible member being connected to said elongated member remote from said rear pivot.

References Cited in the file of this patent

UNITED STATES PATENTS

| | | |
|---|---|---|
| 545,867 | Bacon | Sept. 10, 1895 |
| 568,534 | Huff | Sept. 29, 1896 |
| 821,593 | Lindsay | May 22, 1906 |
| 934,575 | Schreiber | Sept. 21, 1909 |
| 1,403,908 | Mineart | Jan. 17, 1922 |
| 1,787,800 | Stroburg et al. | Jan. 6, 1931 |
| 2,351,369 | Rutter | June 13, 1944 |
| 2,546,412 | White et al. | Mar. 27, 1951 |
| 2,651,983 | Weast | Sept. 15, 1953 |
| 2,856,833 | Pereira et al. | Oct. 21, 1958 |

FOREIGN PATENTS

| | | |
|---|---|---|
| 543,362 | France | June 1, 1922 |